United States Patent
Head

(10) Patent No.: US 8,233,892 B1
(45) Date of Patent: Jul. 31, 2012

(54) PAGER AND PEN IMPLEMENT

(76) Inventor: Ruby N. Head, Fort Walton, FL (US)

( * ) Notice: Subject to any disclaimer, the term of this patent is extended or adjusted under 35 U.S.C. 154(b) by 197 days.

(21) Appl. No.: 12/837,260

(22) Filed: Jul. 15, 2010

Related U.S. Application Data

(60) Provisional application No. 61/270,877, filed on Jul. 15, 2009.

(51) Int. Cl.
*H04W 3/00* (2006.01)
(52) U.S. Cl. ............... 455/418; 455/412.1; 340/7.28
(58) Field of Classification Search ............ 455/412.1, 455/414.1, 418–422.1, 425, 426.1, 458, 466, 455/18, 41.2, 514, 515, 70, 83–88, 550.1, 455/552.1, 553.1, 556.1, 556.2, 557, 567, 455/575.1–575.8, 90.1, 90.2, 90.3, 128, 72, 455/151.2, 342–355; 340/7.63, 4.12–4.14, 340/4.4, 4.42, 4.51, 4.62, 5.22–5.25, 5.61, 340/5.64–5.67, 7.1, 7.24, 7.28, 7.39, 7.51, 340/7.6, 7.62, 10.51, 12.23, 12.5–12.55, 340/13.21, 13.24–13.26, 13.32; 370/313, 370/346; 379/88.15, 67.1, 170, 217.01
See application file for complete search history.

(56) References Cited

U.S. PATENT DOCUMENTS

| | | | |
|---|---|---|---|
| 5,192,947 A * | 3/1993 | Neustein | ............... 340/7.63 |
| D423,010 S | 4/2000 | Wicks | |
| 6,233,430 B1 * | 5/2001 | Helferich | ............... 340/7.21 |
| D445,777 S | 7/2001 | Scalisi | |
| 6,587,052 B1 * | 7/2003 | Flick | ............... 340/12.55 |
| 6,597,281 B1 | 7/2003 | Thomas | |
| 6,606,506 B1 * | 8/2003 | Jones | ............... 455/556.1 |
| D483,738 S | 12/2003 | Lovegreen et al. | |
| D483,773 S | 12/2003 | Lovegreen et al. | |
| D484,111 S | 12/2003 | Livingston et al. | |
| 6,816,087 B2 * | 11/2004 | Lane | ............... 340/945 |
| 6,853,293 B2 | 2/2005 | Swartz et al. | |
| D507,558 S | 7/2005 | Lovegreen et al. | |
| D523,416 S | 6/2006 | Tompkins et al. | |
| 7,116,940 B2 | 10/2006 | Dvorak | |
| 2005/0239450 A1 * | 10/2005 | Wesby | ............... 455/418 |
| 2009/0273585 A1 * | 11/2009 | De Haan et al. | ............... 345/179 |

* cited by examiner

*Primary Examiner* — Kent Chang
*Assistant Examiner* — San Htun
(74) *Attorney, Agent, or Firm* — Montgomery Patent & Design, LLC; Robert C. Montgomery; Joseph T. Yaksich

(57) ABSTRACT

The present invention discloses a portable radio frequency (RF) paging system providing conventional beeping, vibration, and illumination alarms as well as playing or transmitting a pre-recorded message to a responder. The paging system comprises transmitter and receiver modules. The transmitter portion of the paging system is to be capable of digitally recording a verbal message for replay or transmission to the receiver upon initiation of a page. The receiver portion of the paging system is housed within a pen-shaped enclosure which may be conveniently attached to a responder's pocket while also functioning as a normal writing instrument.

20 Claims, 2 Drawing Sheets

PAGER AND PEN IMPLEMENT

RELATED APPLICATIONS

The present invention was first described in and claims the benefit of U.S. Provisional Application No. 61/270,877 filed Jul. 15, 2009, the entire disclosures of which are incorporated herein by reference.

FIELD OF THE INVENTION

The present invention relates generally to remote communications devices, and in particular, to a paging device adapted for concealability, functionality, and portability.

BACKGROUND OF THE INVENTION

Remote communications and paging systems are ubiquitous in the modern world, particularly in fields where workers must remain "on-call" in order to respond to a particular emergency at a moment's notice, such as in the fields of emergency response, emergency rescue, and various medical fields. In hospital settings, for example, nurses must be readily reachable in order to respond to a particular patient's needs as such needs are often critical and time sensitive.

In crowded settings such as hospitals it is not uncommon for a large percentage of workers to utilize such technology. This can lead to increased noise pollution, ambiguity regarding whose pager was activated, etc. Furthermore, workers such as nurses often attend multiple patients, situations, and responsibilities simultaneously. Often times, upon receipt of a page, the worker must then contact a single pre-determined central location who then provides the worker with the specifics of the intended message. This system leads to great lag time between the sending of the message and a response by the intended recipient, additional organization and manpower requirements, and general nuisance regarding the obtrusive nature of the system, both audibly and visually.

Various attempts have been made to provide pagers of an easily transportable or inconspicuous nature. Examples of these attempts can be seen by reference to several U.S. patents. U.S. Pat. No. 6,597,281, issued in the name of Thomas, describes a device which integrally incorporates pager capabilities into a belt buckle housing.

U.S. Pat. No. 6,853,293, issued in the name of Swartz et al., describes a wearable communication system with a wrist-mounted control module and various other components and electronic controls which allow a user to transport the system during daily use in a hands-free manner.

Additionally, ornamental designs for a pager device exist such as U.S. Pat. Nos. D 423,010, D 483,773, D 507,558, and D 523,416. However, none of these designs are similar to the present invention.

While these devices fulfill their respective, particular objectives, each of these references suffer from one (1) or more of the aforementioned disadvantages. Many such devices do not provide additional functionality useful during a daily routine. Also, many such devices are difficult to access or utilize due to the manner in which they are restrained or transported. Furthermore, many such devices are not easily portable due to inherent limitations in range of suitable mounting locations on a person and difficulty in removal or relocation of the device. In addition, many such devices do not provide inconspicuous or otherwise unobtrusive appearances and notification functions. Moreover, many such devices do not provide a system for quickly notifying a receiver of particular information regarding the nature of the pager communication. Accordingly, there exists a need for a pager device without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a means to provide an easily portable pager-style communication device which is useful and unobtrusive to a user and their environment on a constant daily basis while providing a full range of features regarding notification and messaging. Thus, the object of the present invention is to solve the aforementioned disadvantages and provide for this need.

To achieve the above objectives, it is an object of the present invention to provide a portable audio paging system comprising a transmitter assembly and one (1) or more receiver assemblies, where said transmitter provides wireless communication with each receiver assembly via a one-way RF signal.

Another object of the present invention is to provide a means to pre-record a message for automatic transmission to a responder in order to provide specific and useful information to an end user.

Yet still another object of the present invention is to allow for convenient storage of the transmitter assembly for use in a plurality of desirable locations. The transmitter assembly comprises a transmitter case which provides external surfaces for attachment of alarm devices and control features for the various audio communication features.

Yet still another object of the present invention is to provide additional functionality for a user of the receiver assembly by functioning as an ink pen. A distal end portion of the pen-shaped receiver case comprises a conventional pen applicator tip and cap.

Yet still another object of the present invention is to provide further audio pager functionality within the receiver assembly comprises internal electrical and electronic components including vibrational and visual message notification means, an integral speaker for receiving audio messages, a battery powering means, an ON/OFF switch, and the like.

Yet still another object of the present invention is to allow a user to easily transport the receiver in an unobtrusive and hands-free manner by providing the appearance and fastening capabilities of a conventional ink pen.

Yet still another object of the present invention is to provide a variety of message and voice transmitting capabilities to a user of the transmitter assembly including pre-recorded message broadcasting, real-time audio messaging, and conventional paging capabilities.

Yet still another object of the present invention is to allow one (1) or more receiver assemblies to work in conjunction with a single transmitter assembly to form a local paging network.

Yet still another object of the present invention is to provide a method of utilizing the device that provides a unique means of procuring a system comprising a desired number of receiver assemblies, activating the transmitter and corresponding receiver assemblies, placing the transmitter assembly in a location suitable for a user such as in a hospital room, on a nursing cart, or the like, easily attaching a receiver assembly to an end user's clothing or otherwise retaining the receiver during daily activities, easily and inconspicuously transporting the receiver assembly, utilizing the receiver assembly in the manner of a conventional writing utensil, paging the end user, alerting the end user via vibrational or visual paging notification, communicating to an end user a pre-recorded message, communicating to an end user in real-time audio communication, providing specific instructions to an end user, providing responders with a means to provide quick responses to a paging communication, and utilizing multiple receiver assemblies in conjunction to form a local paging network.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| | |
|---|---|
| 10 | pager and pen implement |
| 20 | transmitter assembly |
| 21 | transmitter circuit board |
| 22 | transmitter case |
| 23 | transmitter speaker |
| 24 | transmitter ON/OFF indicia |
| 25 | transmitter ON/OFF switch |
| 26 | transmitter lamp |
| 27 | transmitter record and page control button |
| 28 | first battery |
| 29 | first battery compartment |
| 30 | first battery compartment cover |
| 31 | transmitter recorder circuit board |
| 32 | transmitter recorder play control button |
| 34 | microphone |
| 40 | receiver assembly |
| 41 | receiver circuit board |
| 42 | receiver lamp |
| 43 | receiver case |
| 44 | receiver shirt pocket clip |
| 45 | second battery |
| 46 | second battery compartment |
| 47 | second battery compartment cover |
| 48 | receiver ON/OFF switch |
| 49 | vibrating device |
| 50 | receiver speaker |
| 55 | pen applicator tip |
| 57 | pen cap |
| 60 | radio frequency (RF) signal |
| 65 | illumination |

DETAILED DESCRIPTION OF THE PREFERRED EMBODIMENT

Figure 1:
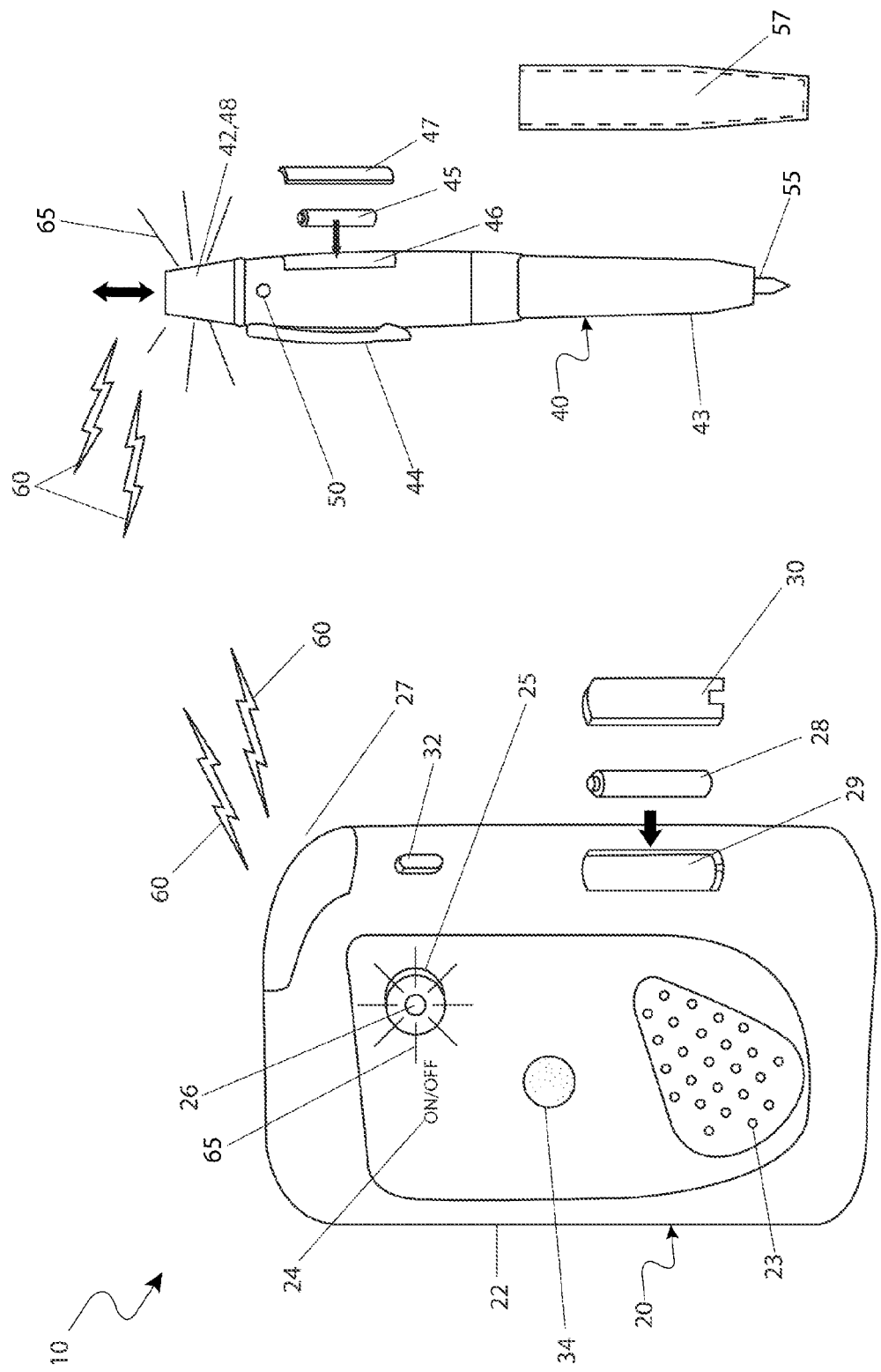
FIG. 1 is a front perspective of a pager and pen implement 10, according to a preferred embodiment of the present invention; and, FIG. 2 is an electrical block diagram of the pager and pen implement 10, according to a preferred embodiment of the present invention.
Figure 2:
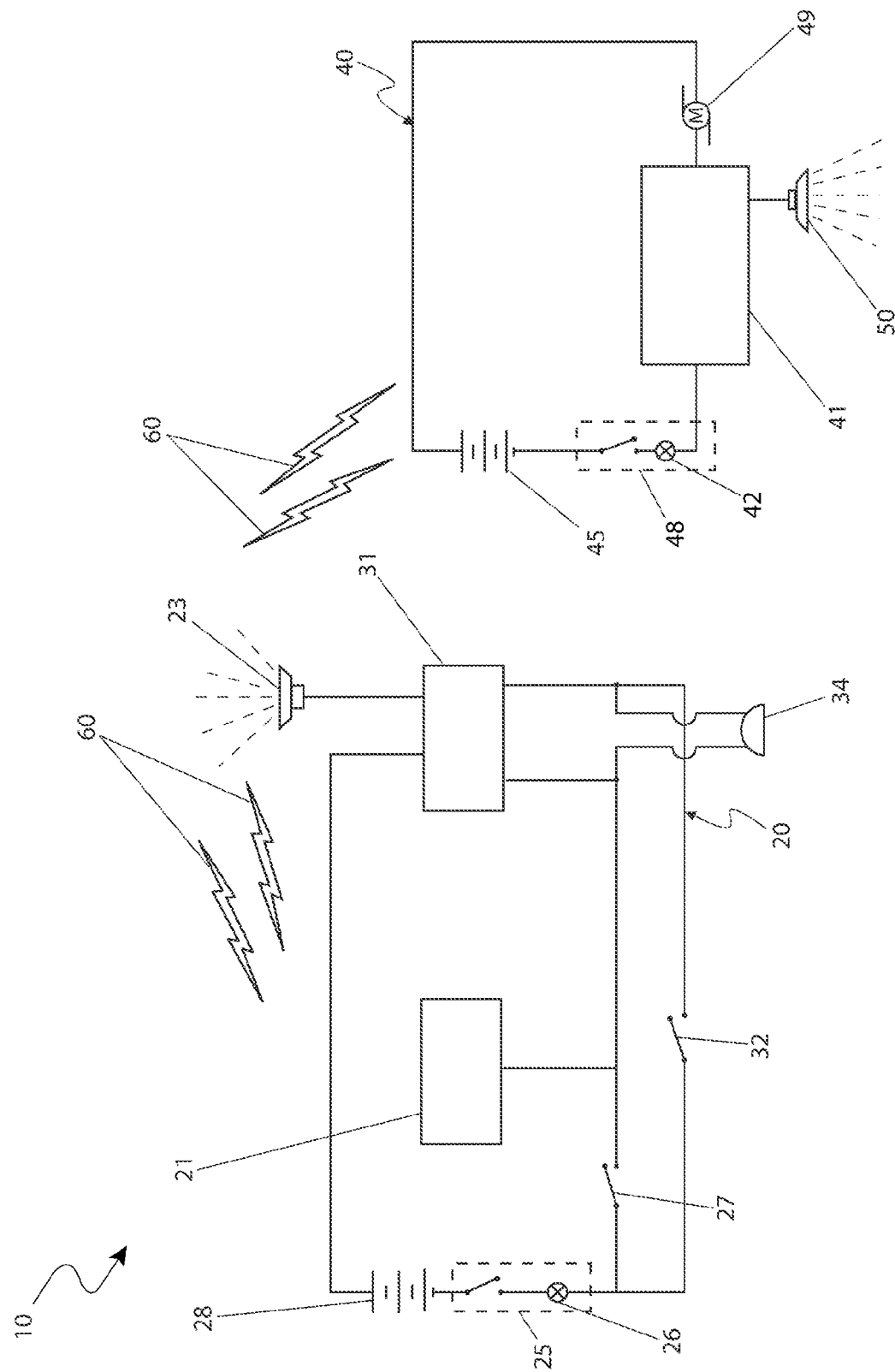

The best mode for carrying out the invention is presented in terms of its preferred embodiment, herein depicted within FIGS. 1 and 2. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a pager and pen implement (herein described as the "system") 10, which provides a portable audio paging system comprising a means to pre-record a message for automatic transmission to a responder, an integral vibrating device 49, and an illuminating alarm 42. The system 10 comprises a pen-shaped receiver assembly 40 which also functions as a normal writing instrument.

Referring now to FIG. 1, a front perspective view of the system 10, according to the preferred embodiment of the present invention, is disclosed. The system 10 comprises a transmitter assembly 20 and a receiver assembly 40. The transmitter assembly 20 comprises a rectangular electronic enclosure capable of convenient storage upon a desk or counter top, within a user's hand, pocket, purse, or the like. Said transmitter assembly 20 further comprises a protective plastic transmitter case 22 providing external surfaces which provide attachment of alarm devices and control features including a transmitter speaker 23, transmitter ON/OFF indicia 24, a power regulating transmitter ON/OFF control switch 25 having an integral transmitter lamp 26, a transmitter record and page activating control button 27, a first battery compartment cover 30, and an activating transmitter recorder play control button 32. Furthermore, the transmitter case 22 provides protective enclosure of internal components including a transmitter circuit 21, a first battery 28, a first battery compartment 29, and a transmitter recorder circuit 31. Said transmitter assembly 20 provides wireless communication with the receiver assembly 40 via a one-way RF signal 60 (see FIG. 2).

The receiver assembly 40 comprises an external plastic receiver case 43 being conveniently sized and shaped in a form of a functioning writing pen. The receiver assembly 40 performs a conventional pager receiver function as well as functioning as a normal ink pen. At a distal end portion, said pen-shaped receiver case 43 comprises a conventional felt-tip or ball-point pen applicator tip 55 and a protective "snap-on" pen cap 57 or equivalent enclosure means. At an opposing proximal end portion of said receiver case 43 is a receiver lamp 42 which comprises an illuminated spring-return push-button device which provides both illuminated indication 65 of a received page as well as a toggling power switching means via an integral receiver ON/OFF switch 48.

The receiver assembly 40 further provides internal electrical and electronic components enabling an audio pager function including an RF receiver circuit board 41, a second battery 45, a second battery compartment 46, a second battery compartment cover 47, a motorized vibrating device 49, and a receiver speaker 50 capable of broadcasting both "beeping" and voice sound. The receiver case 43 also comprises an integrally-molded receiver shirt pocket clip 44 along a side surface being similar to like attachment features found on standard writing instruments, thereby enabling the receiver assembly 40 to be fastened to a shirt pocket or similar appendage.

Portions of the system 10 including the transmitter case 22, first battery compartment 29, first battery compartment cover 30, the receiver case 43, the second battery compartment 46, and the second battery compartment cover 47, are envisioned to be made of plastic parts comprising materials such as, but not limited to: ABS, polypropylene, thermoplastic olefins, or the like, being produced using custom molds. It is envisioned that the electronic components that comprise the system 10 would be commonly available through manufactures of those parts.

The system 10 may provide one (1) or more receiver assemblies 40 which may work in conjunction with a single transmitter assembly 20 to form a local paging network so as to communicate a page and/or instructions to multiple responders.

Referring now to FIG. 2, an electrical block diagram of the system 10, according to the preferred embodiment of the present invention, is disclosed. The system 10 comprises a transmitter assembly 20 and a receiver assembly 40. Both the transmitter assembly 20 and the receiver assembly 40 comprise small battery-powered electronic modules. Said transmitter assembly 20 further comprises the transmitter circuit board 21 and the transmitter recorder circuit board 31. Said receiver assembly 40 further comprises the receiver circuit board 41. Said circuit boards 21, 31, 41 comprise conventional microprocessor-based printed circuit boards or equivalent technologies comprising expected electrical and electronic components such as, but not limited to: embedded software, input and output signal connections and electronics, integrated circuits, wiring, and the like.

The transmitter record and page control button 27 and the transmitter recorder play control button 32 portions of the transmitter assembly 20 may provide various functions by being pressed individually, one-at-a-time, or in specific sequences, to provide pager functions such as, but not limited to: storing a pre-recorded message within the transmitter recorder circuit board 31 using an integral microphone 34 located along a front surface of the transmitter case 22; utilizing said control buttons 27, 32 to initiate an RF signal 60 transmission of said pre-recorded message to the receiver assembly 40 for broadcasting from a receiver speaker portion 50 of the receiver case 43; broadcasting a real-time audio message from a user using the microphone 34; pressing the transmitter record and page control button 27 to provide indication of said page via illumination 65 of the receiver lamp portion 42 and vibrating activation of the internal vibrating device 49; and, to play back said pre-recorded message through the transmitter speaker portion 23 of the transmitter case 22, also located along a front surface of said transmitter assembly 20.

The receiver assembly 40 receives an RF signal 60 from the transmitter assembly 20 in a one-way conventional configuration and does not provide for duplex communication. Said transmitter assembly 20 is in wireless communication with the receiver assembly 40 via a one-way RF signal 60 being of a frequency modulated (FM) signal on a frequency authorized for such use; however, other methods of modulation such as amplitude modulation (AM), single side band, digital, continuous wave and the like would work equally well, and as such, should not be interpreted as a limiting factor of the present invention 10.

The transmitter ON/OFF switch 25 and the receiver ON/OFF switch 48 comprise spring-return illuminated push button devices operated by pressing downwardly on said switches 25, 48 once to turn "ON", and once more to turn "OFF" respective transmitter 20 and receiver 40 assemblies. The receiver ON/OFF switch 48 is preferably transparent or translucent in order to enable the illumination 65 of the receiver lamp 42 to be readily visible. The transmitter ON/OFF switch 25 has the further functionality of turning on and off the illumination 65 in conjunction with supplying power to the transmitter assembly 20.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the system 10, it would be utilized as indicated in FIG. 1.

The preferred method of utilizing the system 10 in a hospital or other physical care facility, may be achieved by performing the following steps: procuring the system 10 having a desired number of receiver assemblies 40; pressing the transmitter ON/OFF control switch 25 to activate the transmitter assembly 20 as indicated by illumination 65 of the integral transmitter lamp 26; pressing downwardly on the receiver lamp 42 to activate the receiver assembly 40 as indicated by momentary illumination of said receiver lamp 42; placing the transmitter assembly 20 in a location where it is to be used such as, but not limited to: in a patient's room, on a nursing cart, at a nursing station, in a hallway, or anywhere else that it may be needed; attaching the receiver assembly 40 to a responder's shirt pocket or other suitable appendage; retaining the receiver assembly 40 within the responder's pocket during the normal execution of one's duties; utilizing the receiver assembly 40 as a normal writing instrument as needed; paging the responder by pressing on the transmitter record and page control button 27, thereby activating a conventional "beeping" sound from the receiver speaker 50, illuminating the receiver lamp 42, and activating the vibrating device 49 to communicate a transmitted page; responding in a specific manner to said communicated page or proceeding to a location of the transmitter assembly 20 for further instructions; and, benefiting from a compact and multi-functional paging system 10.

The system 10 also provides advanced message communication capabilities which may be utilized by performing the following additional steps: utilizing the pre-recorded message feature of the system 10 by pressing the transmitter recorder play control button 32 or a combination of the transmitter recorder play control button 32 and the transmitter record and page control button 27 to record a message within the transmitter recorder circuit board 31; speaking a message into the microphone portion 34 of the transmitter assembly 20; releasing the button 32, 27 to stop recording; verifying successful recording of the massage by pressing on the transmitter recorder play control button 32 or a combination of the transmitter recorder play control button 32 and the transmitter record and page control button 27, to broadcast and listen to said message from the transmitter speaker 23; and, paging the responder when needed by pressing on the transmitter record and page control button 27, thereby automatically broadcasting the pre-recorded message through the receiver speaker 50 as well as activating the receiver lamp 42 and vibrating device 49 portions of the receiver assembly 40 as previously described. The responder may also return to the location of the transmitter to replay said pre-recorded message if necessary. The pre-recorded message is envisioned to provide specific instructions from someone such as a doctor, nurse, caregiver, or manager to the responder who is in possession of the receiver assembly 40.

Furthermore, the system 10 may be utilized to communicate a real-time voice message from a caregiver in possession of the transmitter assembly 20 by performing the following additional steps: pressing the transmitter recorder play control button 32 or a combination of the transmitter recorder play control button 32 and the transmitter record and page control button 27; speaking directly into the microphone portion 34 of the transmitter assembly 20 to immediately transmit said real-time message to the receiver assembly 40; and, releasing the button 32, 27 to halt the message transmission. The real-time message may provide immediate specific instructions to the responder possessing the transmitter assembly 20.

It is further understood that one (1) or more receiver assemblies 40 may be used in conjunction with a single transmitter assembly 20 to form a local paging network so as to communicate a page and/or instructions to multiple responders. It is further envisioned that the system 10 could be used in many widely varied applications; however, it is especially useful to emergency workers in the medical field. In the medical field, application the transmitter assembly 20 could be positioned in a patient's room, on a nursing cart, in a hallway, at a nursing station or practically anywhere. The transmitter assembly 20 is used to signal the receiver assembly 40 being carried by a responder such as a nurse. The receiver assembly 40 provides signaling of a responder by way of sound, vibration, and illumination. Additionally, the transmitter assembly 20 provides a means to communicate a digitally recorded verbal message. In such a manner, patient care instructions or other message can be immediately available for communication to a responder via a transmitted RF signal 60 in one operation. The responder may react specifically to said transmitted instructions, return to the location of the transmitter assembly 20 location and listen to the recorded message, receive additional instructions, or the like. The system 10 improves timeliness of care provided to a patient without the necessity of searching for a specific responder such as a nurse or other caregiver and then relaying patient care information. The use of the system 10 provides nurses and other medical care providers a means to provide quick response to their patients without the necessity of being in close physical proximity.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A paging system, comprising:
 a pager, comprising:
  a pager housing;
  a transmitter circuit board housed with said pager housing;
  a transmitter control switch in electrical communication with said transmitter circuit board and located on said pager housing, thereby providing power to said transmitter circuit board;
  a transmitter recorder circuit board housed within said pager housing;
  a transmitter record and page activating control button in electrical communication with said transmitter recorder circuit board and located on said pager housing;
  a transmitter recorder play control button located on said pager housing and in electrical communication with said transmitter recorder circuit board;
  a transmitter speaker in electrical communication with said transmitter recorder circuit board;
  a microphone in electrical communication with said transmitter recorder circuit board and said transmitter record and page activating control button; and,
  a pager power supply in electrical communication with and provides power to said transmitter circuit board and said transmitter recorder circuit board;
 a receiver in wireless communication with said pager, further comprising a receiver assembly housed within a receiver housing, said receiver assembly further comprising:
  a receiver circuit board housed with said receiver housing;
  a receiver control switch in electrical communication with said receiver circuit board and located on said receiver housing, thereby providing power to said receiver circuit board;
  a receiver power supply in electrical communication with and supplying power to said receiver circuit board;
  a vibrating device housed within said receiver housing and in electrical communication with said receiver circuit board; and,
  a receiver speaker housed within said receiver housing and in electrical communication with said receiver circuit board;
 wherein said transmitter circuit board generates and transmits a paging signal upon an activation of said transmitter record and page activating control button;
 wherein said transmitter recorder circuit board generates and records a pre-recorded signal as delivered by a user through said microphone and transmitted by said transmitter circuit board upon a single activation of said transmitter record and page activating control button;
 wherein said transmitter recorder play control button plays back said pre-recorded signal through said transmitter speaker;
 wherein said transmitter recorder circuit board generates a real-time signal as delivered by said user through said microphone and transmitted by said transmitter circuit board upon a continuous concurrent activation of said transmitter record and page activating control button;
 wherein said receiver circuit board receives said paging signal, said pre-recorded signal, or said real-time signal;
 wherein said vibrating device generates and transmits a vibrating motion to said receiver when said paging signal, said pre-recorded signal, or said real-time signal is received by said receiving circuit board; and,
 wherein said receiver speaker plays back said paging signal, said pre-recorded signal, or said real-time signal when received by said receiving circuit board.

2. The paging system of claim 1, wherein said pager housing further comprises a rectangular enclosure sized to be carried within a pocket or purse or hand of said user.

3. The paging system of claim 1, further comprising a transmitter lamp located on and in electrical communication with said transmitter control switch;

wherein said transmitter lamp is illuminated when said transmitter control switch is activated to an ON position; and, wherein said transmitter lamp is deactivated when said transmitter control switch is activated to an OFF position.

4. The paging system of claim 3, further comprising ON/OFF indicia located on said pager housing adjacent to said transmitter control switch.

5. The paging system of claim 1, wherein said pager power supply further comprises a battery compartment within said pager housing, a battery, and a battery compartment access door removably attached to said pager housing for providing access to said battery compartment.

6. The paging system of claim 1, wherein said paging signal, said pre-recorded signal, and said real-time signal each comprises a one-way RF signal.

7. The paging system of claim 1, wherein said receiver housing further comprises a writing implement body;
   wherein said receiver assembly is located at a first end of said writing implement body and a marking means is located at an opposing second end of said writing implement body;
   wherein a clip is located on a side of said first end of said writing implement body for suspending said receiver from a support structure; and,
   wherein a removable cap is attachable to said second end of said writing implement body for covering said marking means.

8. The paging system of claim 1, further comprising a receiver lamp located within and in electrical communication with said receiver control switch;
   wherein said receiver lamp is momentarily illuminated when said receiver control switch is activated to an ON position;
   wherein said receiver lamp is deactivated when said receiver control switch is activated to an OFF position; and
   wherein said receiver lamp is momentarily activated when said receiver circuit board receives said paging signal, said pre-recorded signal, or said real-time signal.

9. The paging system of claim 1, wherein said receiver power supply further comprises a battery compartment within said receiver housing, a battery, and a battery compartment access door removably attached to said receiver housing for providing access to said battery compartment.

10. A method of transmitting a paging signal from a transmitter to a receiver housed within a writing implement comprises the following steps:
   providing said transmitter, further comprising:
      a pager housing;
      a transmitter circuit board housed with said pager housing;
      a transmitter control switch in electrical communication with said transmitter circuit board and located on said pager housing, thereby providing power to said transmitter circuit board;
      a transmitter lamp located on and in electrical communication with said transmitter control switch;
      a transmitter recorder circuit board housed within said pager housing;
      a transmitter record and page activating control button in electrical communication with said transmitter recorder circuit board and located on said pager housing;
      a transmitter recorder play control button located on said pager housing and in electrical communication with said transmitter recorder circuit board;
      a transmitter speaker in electrical communication with said transmitter recorder circuit board;
      a microphone in electrical communication with said transmitter recorder circuit board and said transmitter record and page activating control button; and,
      a pager power supply in electrical communication with and provides power to said transmitter circuit board and said transmitter recorder circuit board;
   providing said writing implement having said receiver in a first end and a marking means in a second end, further comprising:
      a receiver circuit board housed with said first end;
      a receiver control switch in electrical communication with said receiver circuit board and located on said first end, thereby providing power to said receiver circuit board;
      a receiver lamp located within and in electrical communication with said receiver control switch;
      a receiver power supply located within said first end and in electrical communication with and supplying power to said receiver circuit board;
      a vibrating device housed within said first end and in electrical communication with said receiver circuit board;
      a receiver speaker housed within said first end and in electrical communication with said receiver circuit board;
      a clip located on a side of said first end of said writing implement; and,
      a removable cap attachable to said second end of said writing implement;
   activating said transmitter circuit board by activating said transmitter control switch;
   observing an illumination by said illumination lamp, thereby verifying an ON condition of said transmitter circuit board;
   activating said receiver circuit board by activating said receiver control switch;
   observing a momentary illumination by said receiver lamp, thereby verifying an ON condition of said receiver circuit board;
   activating said transmitter record and page activating control button, thereby generating a paging signal within said transmitter circuit control board, wherein said transmitter circuit board transmits said paging signal; and,
   receiving said paging signal by said receiver circuit board, wherein said vibrating device provides a tactile indication of receipt of said paging signal, said receiver speaker provides an audible indication of receipt of said paging signal, and said receiver lamp provides a visual indication of receipt of said paging signal.

11. The method of claim 10, further comprising the following step:
   utilizing said marking means portion of said writing implement independent of or concurrently with receipt of said paging signal.

12. The method of claim 10, further comprising the steps of:
   providing a plurality of receivers within a paging network; and,
   transmitting said paging signal to each receiver within said paging network.

13. The method of claim 10, further comprising the steps of:
- recording a pre-recorded signal onto said transmitter recorder circuit board through said microphone, wherein said transmitter recorder circuit board generates said pre-recorded signal;
- activating said transmitter record and page activating control button, wherein said transmitter circuit board transmits said pre-recorded signal; and,
- receiving said pre-recorded signal by said receiver circuit board, wherein said vibrating device provides a tactile indication of receipt of said pre-recorded signal, said receiver speaker provides an audible indication of receipt of said pre-recorded signal, and said receiver lamp provides a visual indication of receipt of said pre-recorded signal.

14. The method of claim 13, further comprising the step of:
- playing back said pre-recorded signal on said transmitter speaker by activating said transmitter recorder play control button.

15. The method of claim 13, further comprising the following step:
- utilizing said marking means portion of said writing implement independent of or concurrently with receipt of said pre-recorded signal.

16. The method of claim 13, further comprising the steps of:
- providing a plurality of receivers within a paging network; and,
- transmitting said pre-recorded signal to each receiver within said paging network.

17. The method of claim 13, further comprising the step of:
- recording a new pre-recorded signal onto said transmitter recorder circuit board through said microphone, wherein said transmitter recorder circuit board overwrites said pre-recorded signal and generates said new pre-recorded signal.

18. The method of claim 10, further comprising the steps of:
- generating a real-time signal onto said transmitter recorder circuit board through said microphone;
- activating said transmitter record and page activating control button, wherein said transmitter circuit board transmits said real-time signal; and,
- receiving said real-time signal by said receiver circuit board, wherein said vibrating device provides a tactile indication of receipt of said real-time signal, said receiver speaker provides an audible indication of receipt of said real-time signal, and said receiver lamp provides a visual indication of receipt of said real-time signal.

19. The method of claim 18, further comprising the following step:
- utilizing said marking means portion of said writing implement independent of or concurrently with receipt of said real-time signal.

20. The method of claim 18, further comprising the steps of:
- providing a plurality of receivers within a paging network; and,
- transmitting said real-time signal to each receiver within said paging network.

* * * * *